United States Patent [19]

Giles, Jr. et al.

[11] Patent Number: 5,094,672

[45] Date of Patent: Mar. 10, 1992

[54] VITREOUS BONDED SOL-GEL ABRASIVE GRIT ARTICLE

[75] Inventors: James H. Giles, Jr.; Soo C. Yoon, both of Cincinnati, Ohio

[73] Assignee: Cincinnati Milacron Inc., Cincinnati, Ohio

[21] Appl. No.: 465,701

[22] Filed: Jan. 16, 1990

[51] Int. Cl.⁵ .............................................. B24D 3/02
[52] U.S. Cl. ....................................... 51/309; 51/298; 51/307; 51/308
[58] Field of Search .................. 51/298, 307, 308, 309

[56] References Cited

U.S. PATENT DOCUMENTS

| | | | |
|---|---|---|---|
| 3,955,324 | 5/1976 | Lindstrom | 51/298 |
| 4,314,827 | 2/1982 | Leitheiser et al. | 51/298 |
| 4,518,397 | 5/1985 | Leitheiser et al. | 51/309 |
| 4,543,107 | 9/1985 | Rue | 51/309 |
| 4,623,364 | 11/1986 | Cottringer et al. | 51/309 |
| 4,741,743 | 5/1988 | Narayanan et al. | 51/309 |
| 4,744,802 | 5/1988 | Schwabel | 51/309 |
| 4,800,685 | 1/1989 | Haynes, Jr. | 51/281 |
| 4,800,685 | 1/1989 | Haynes, Jr. | 51/298 |
| 4,883,501 | 11/1989 | Haynes, Jr. | 51/309 |
| 4,898,597 | 2/1990 | Hay et al. | 51/298 |
| 4,988,370 | 1/1991 | Haynes, Jr. | 51/309 |
| 4,997,461 | 3/1991 | Markhoff-Matheny et al. | 51/298 |

OTHER PUBLICATIONS

Product bulletin for Rhinalox Bubble Alumina from Rhina Schmelzwerk GmbH, Verkaufsburo Dusseldorf.

*Primary Examiner*—William R. Dixon, Jr.
*Assistant Examiner*—Willie J. Thompson
*Attorney, Agent, or Firm*—John W. Gregg; Donald Dunn

[57] ABSTRACT

There has been discovered the increased E-Modulus and grinding performance of vitreous bonded sol-gel abrasive grit abrasive articles, particularly abrasive grinding wheels, by the incorporation therein of inorganic, non-metallic bubbles. In a practice of the invention the abrasive article comprises a) an abrasive phase having sintered sol-gel alumina abrasive grits and second abrasive grits that are not of the sintered sol-gel type, b) a vitreous bond and c) essentially hollow, essentially spherical alumina particles having a softening temperature at least 50° F. greater than the firing temperature of the vitreous bond.

18 Claims, No Drawings

VITREOUS BONDED SOL-GEL ABRASIVE GRIT ARTICLE

FIELD OF INVENTION

This invention relates to vitreous bonded abrasive articles, more particularly to vitreous bonded sol-gel abrasive grit articles and still more particularly to vitreous bonded sintered, sol-gel abrasive grit grinding wheels.

BACKGROUND

The development and advantages of sintered, sol-gel abrasive grain, particularly sintered, sol-gel, polycrystalline, alpha alumina abrasive grain, in grinding wheels has received a large amount of attention and is well documented in the prior art literature. The use of such grain in bonded grinding wheels has been reported (U.S. Pat. No. 4,314,827 and U.S. Pat. No. 4,744,802). Sol-gel and sintering processes for alumina abrasive grit have been described in numerous patents including for example U.S. Pat. No. 4,314,827 Feb. 9, 1982 to M. A. Leitheiser et al., U.S. Pat. No. 4,623,364 Nov. 18, 1986 to T. E. Cottringer et al. and U.S. Pat. No. 4,744,802 May 17, 1988 to M. G. Schwabel. Disadvantages of fused alumina and performance advantages of sintered, sol-gel alumina abrasive grit in the grinding of metals have been taught by C. V. Rue (U.S. Pat. No. 4,543,107) and D. C. Haynes (U.S. Pat. No. 4,800,685). Haynes has also described the usefulness of a blend of fused alumina and sintered, sol-gel, alumina grains in grinding wheels. C. V. Rue has described a vitreous bonded sintered, sol-gel, alumina grain grinding wheel, wherein the grain is composed of submicron, polycrystalline, noncellular, high density alpha alumina.

Numerous variations on the sol-gel process including changes in the gel composition to include various fluxing or nucleating agents, as well variations in the conditions for carrying out the sintering process have been disclosed in the literature principally to control crystal size of the alumina. Crystal sizes of the alumina have been reported ranging from submicron (U.S. Pat. No. 4,314,827 and U.S. Pat. No. 4,623,364) to 300 microns. Despite a large amount of prior art effort on sintered, sol-gel abrasives and grinding wheels containing such abrasives there has not been the expected wide range use of such abrasives in grinding wheels, particularly vitreous bonded grinding wheels. Although C. V. Rue has reported some improvement in grinding performance with vitreous bonded sintered, sol-gel alumina grit grinding wheels, he has also noted in U.S. Pat. No. 4,543,107 some performance of such grinding wheels that is poorer than that obtained with vitreous bonded 100% fused alumina abrasive grit grinding wheels. Other disadvantages of the prior art vitreous bonded sintered, sol-gel, alumina abrasive articles, i.e. grinding wheels, have been observed during grinding of metals, including heat build up, high friction, low cutting and workpiece burn. Thus the vitreous bonded sintered, sol-gel, alumina abrasive grit grinding wheels of the art have not shown sufficient advantage, on a cost performance basis, to achieve substantial usage.

It is an object of this invention to provide an improved vitreous bonded sintered sol-gel abrasive grit abrasive article.

It is another object of this invention to provide a vitreous bonded sintered, sol-gel abrasive grit abrasive article having reduced heat build up, lower friction and improved cutting performance.

A still further object of this invention is to provide a vitreous bonded sintered. sol-gel abrasive grit abrasive article overcoming many, if not all, of the disadvantages of the prior art vitreous bonded sintered, sol-gel abrasive grit abrasive articles.

DESCRIPTION OF THE INVENTION

It has now been discovered that the aforementioned objects and others, as will be apparent from the following description and claims, can be achieved by a vitreous bonded abrasive article, such as a grinding wheel, comprising a) an abrasive phase having sintered, sol-gel abrasive grits, b) a vitreous bond phase and c) inorganic, non-metallic, hollow or essentially hollow particles.

There has now been unexpectedly discovered that vitreous bonded abrasive articles, in particular grinding wheels, made with sintered, sol-gel abrasive grits can be improved in both strength and grinding performance by the inclusion therein of inorganic, non-metallic, hollow or essentially hollow particles, hereinafter referred to as "bubbles". Observations indicate that the bubbles retain their configuration in the resulting abrasive article. During wet grinding with the abrasive article of this invention, it has been observed that penetration of grinding fluid into the cutting zone and the surface of the wheel is increased over the comparable abrasive article without the bubbles. This leads to better lubrication of the cutting zone. Lower friction, less heat build up and reduced burning of the workpiece have also been observed during the use of the abrasive article of this invention. Higher E-modulus, greater strength, increased retention of the wheel geometry, higher grinding ratios and improved wheel life are other advantages seen for the grinding wheel of this invention over comparable wheels without the bubbles.

Abrasive articles of this invention comprising a) an abrasive phase of sintered, sol-gel, polycrystalline, alpha alumina abrasive grits, b) a vitreous bond and c) inorganic, non-metallic bubbles are contemplated.

It is also contemplated in the practice of this invention an abrasive article comprising a) an abrasive phase of sintered, sol-gel abrasive grits and second abrasive grits, b) a vitreous bond and c) inorganic, non-metallic, bubbles.

In the practice of this invention, there is further contemplated an abrasive article comprising a) an abrasive phase of sintered, sol-gel, polycrystalline, alpha alumina abrasive grits and abrasive grits obtained by a process other than the sol-gel process, b) a vitreous bond and c) inorganic, non-metallic bubbles.

A vitreous bonded abrasive article of this invention comprising a) an abrasive phase of sintered, sol-gel, sub micron polycrystalline, alpha alumina abrasive grit, b) a vitreous bond and c) inorganic, non-metallic bubbles is a further contemplated embodiment.

A further practice of this invention includes a vitreous bonded abrasive article comprising a) an abrasive phase of sintered, sol-gel, submicron, polycrystalline, alpha alumina abrasive grit, b) a vitreous bond and c) inorganic, non-metallic, essentially hollow alumina bubbles.

In a still further embodiment of this invention there is contemplated an abrasive article comprising a) an abrasive phase of sintered, sol-gel, polycrystalline, alpha alumina abrasive grit and fused alumina abrasive grit, b) a vitreous bond and c) inorganic, non-metallic bubbles.

A preferred practice of an abrasive article of this invention is a grinding wheel.

The abrasive phase of the abrasive article of this invention is the solid or essentially solid abrasive grits of conventional sizes present in the article. Such abrasive grits may be of a single composition, structure and size or may be of more than one composition, structure and size. In accordance with the practice of this invention, there may be employed as the abrasive phase 100% by weight of said phase of sintered, sol-gel abrasive grit. There may also be used a blend of sintered, sol-gel abrasive grit and a second abrasive grit, eg. an abrasive grit that is not a sintered, sol-gel abrasive grit or an abrasive grit made by a process other than a sol-gel process as the abrasive phase in the practice of this invention. Such second abrasive grit may be present in the range of from 0 to 90%, more particularly 0 to 50%, by weight of the abrasive phase and is not a sintered, sol-gel abrasive grit. Mixtures of two or more sintered, sol-gel abrasive grits varying in composition, crystal size or other chemical or physical features may be used in the practice of this invention. Various sintered, sol-gel abrasive grits, particularly sintered, sol-gel, alumina abrasive grits, well known in the art and commercially available may be used. Sintered sol-gel alumina abrasive grits are described in U.S. Pat. Nos. 4,314,827; 4,518,397; 4,623,364; 4,744,802; 4,788,167 and U.S. Pat. No. 4,800,685 for example and are also available under the tradename Cubitron (a registered trademark of the Minnesota Mining and Manufacturing Company). Sol gel aluminum nitride/aluminum oxynitride abrasive grit has been described in U.S. Pat. No. 4,788,167. Preferably the sintered, sol-gel abrasive grit is a sintered, sol-gel, polycrystalline, high density, i.e. at least 95% of theoretical density, alpha alumina abrasive grit and more preferably a sintered, sol-gel, submicron, polycrystalline, high density (i.e. at least 95% of theoretical density), alpha alumina abrasive grit. The size of the crystals in the sintered, sol-gel alumina abrasive grit may vary over a wide range, for example from less than 1 micron, e.g. 0.5 microns, to 200 microns. However, the preferred crystal size is of the order of from 0.3 to about 20 microns. It is contemplated that it may be desirable that the abrasive phase of the abrasive article of this invention be a mixture of two or more sintered, sol-gel, alpha alumina abrasive grits of different composition and/or crystal size.

Abrasive grits that are not of the sintered, sol-gel type or are made by a process other than the sol-gel process which may be used in the practice of this invention include, but are not limited to, fused alumina, zirconia, cofused alumina/zirconia, silicon carbide, cubic boron nitride, tungsten carbide, titanium carbide, tungsten boride, boron carbide, zirconium carbide, titanium boride, zirconium boride, tungsten nitride, titanium nitride and zirconium nitride. The use of fused alumina abrasive grits together with the sintered, sol-gel abrasive grits is a preferred blend of abrasive grits for the practice of this invention.

There is required in the abrasive article of this invention inorganic, non-metallic bubbles. Preferably, the bubbles are alumina bubbles and may be obtained by the atomization of molten high purity alumina with compressed air. Such alumina bubbles are commercially available, for example, under the tradename Rhinalox Bubble Alumina, and are known to be usable in grinding wheels, not employing sol-gel abrasive grits, to control porosity of the wheel. These bubbles generally have a nominal wall thickness of about 100 microns and are made up of fused alpha alumina crystals having a size of about 50 microns. They are essentially hollow, essentially spherical particles of a refractory material and have a softening temperature of at least 50° F. above the firing temperature of the vitreous bond of the abrasive article. The inorganic, non-metallic, essentially hollow, essentially spherical particles are preferred in the practice of this invention and may be used in the abrasive article of this invention over a wide concentration range, e.g. 2% to 50% by weight based on the weight of the abrasive phase. However, it is preferred to use such bubbles in a concentration range of from 2% to 15% by weight based on the weight of the abrasive phase. Bubbles having a size, i.e. average diameter, of from 0.1 mm to 5 mm may be used in the practice of this invention. It is, however, preferred to use bubbles having an average diameter in the range of from 0.5 mm to 1.0 mm. In the practice of this invention, it is preferred that the bubbles retain their general configuration in the resulting abrasive article, and that the abrasive article have a porosity in the range of from 10 to 48% by volume, i.e. total volume of free space as measured by methods well known in the art, based on the entire abrasive article.

There has been unexpectedly discovered that the inclusion of inorganic, non-metallic bubbles into a vitreous bonded sintered, sol-gel abrasive grit abrasive article increases the E-modulus and strength of the abrasive article over a comparable abrasive article without the bubbles. Other unexpected improvements have also been discovered for a grinding wheel of this invention over a comparable grinding wheel without the bubbles, particularly in grinding performance. These improvements include less heat build up, lower friction, higher G ratio (higher volume of metal removed per volume of wheel lost) less burn of the workpiece, greater penetration of coolant into the cutting zone and increased shape retention of formed wheels during grinding.

Formed grinding wheels are wheels molded or subsequently shaped into a desired configuration for grinding workpieces or into a mating configuration for finish grinding workpieces already having an essentially mating configuration.

That this discovery was unexpected may be seen by considering the physical structure of the grinding wheel. Grinding wheels contain pores of various sizes and to various degrees depending on the composition, process of manufacture and the intended use of the wheel. It has been known to add alumina bubbles to grinding wheels to achieve predetermined and controlled high porosity not obtainable by conventional means without great difficulty. The controlled addition of bubbles is intended to create further pores over those that would result alone from the composition and processing factors of the wheel. These additional pores, as well as the conventional pores, occur in the vitreous bond matrix. This increase in the pore content of the vitreous bond matrix by such addition of the bubbles to the wheel reduces the amount of vitreous bond between the abrasive grains in the wheel and leads to a weaker wheel. This result has been observed in high porosity wheels leading to increased wheel break down, high wheel wear, reduced G ratio and low operating speeds. However, in accordance with applicant's invention, the bubbles have not been used to achieve high porosity, but they have unexpectedly been found to provide increased E-modulus, lower wheel wear and higher G ratios over a comparable abrasive article, e.g. a grinding wheel, without the bubbles.

Vitreous bonds of well known compositions and firing conditions may be used in the practice of this invention. It is important however to use vitreous bonds that a) do not exhibit an adverse effect on the 1) structure and properties of the sintered, sol-gel abrasive grits or other abrasive grits and 2) inorganic, non-metallic bubbles, and b) have a firing temperature of at least 50° F. below the softening point of the inorganic, non-metallic bubbles. Vitreous bonds having high flow, low viscosity and a firing temperature, i.e. vitrification temperature, in the range of 1472°-2282° F., are especially useful in making the abrasive article of this invention. The firing temperature of the vitreous bond, usable in the practice of this invention, is to a large extent governed by the composition of the bond and may vary over a wide range with changes in the composition of the bond, provided the above requirements respecting the effect on the abrasive phase and the firing temperature condition with respect to the bubbles are maintained. Such variations in the vitreous bond composition to achieve changes in firing temperature are well known in the art. In a preferred practice of this invention, there is used a bond having a firing temperature in the range of from 1652°-2102° F.

In making the abrasive articles of this invention, there may be used other materials well known in the art for aiding the manufacture of abrasive articles and/or acting as grinding aids to further enhance grinding performance. Such other materials include, for example, waxes, resin and temporary binders for aiding the manufacture of the vitreous bonded abrasive article.

Various methods well known in the art for making abrasive articles, such as grinding wheels, may be used in making the abrasive article of this invention. For example, in one such method, the sintered, sol-gel abrasive grits, and any second abrasive grits if desired, are thoroughly blended with a powdered vitreous bond composition, the inorganic, non-metallic bubbles and, if desired, processing aids. The blend is placed in a suitable mold and pressed. This pressed blend is usually dried and then fired in a kiln under an appropriate time and temperature cycle, in a suitable atmosphere, e.g. air, to vitrify the bond and produce the abrasive article.

This invention is further illustrated by the following non-limiting examples in which all weights are in grams, all percentages are by weight and all temperatures are in degrees Fahrenheit unless otherwise indicated. In the examples the Sol-Gel Alumina Abrasive 1 is an alumina abrasive grit in accordance with U.S. Pat. No. 4,744,802 issued May 17, 1988 to M. G. Schwabel and obtained from the Minnesota Mining and Manufacturing Company as grade MLM. Sol-Gel Alumina Abrasive 2 is an alumina abrasive grit in accordance with Example 21 of the disclosure of U.S. Pat. No. 4,314,827 issued Feb. 9, 1982 to M. A. Leitheiser and H. G. Sowman and obtained from the Minnesota Mining and Manufacturing Company as grade MBM. Bond A has the mole percent oxide based composition of $SiO_2$ 63.28; $TiO_2$ 0.32; $Al_2O_3$ 10.99; $Fe_2O_3$ 0.13; $B_2O_3$ 5.11; $K_2O$ 3.81; $Na_2O$ 4.20; $Li_2O$ 4.98; CaO 3.88; MgO 3.04; BaO 0.26. Bond B has the mole percent oxide based composition of $SiO_2$ 64.29; $TiO_2$ 0.62; $Al_2O_3$ 17.55; $Fe_2O_3$ 0.14; $B_2O_3$ 3.91; $K_2O$ 3.49; $Na_2O$ 3.22; CaO 3.63; MgO 3.15. Bond C has the weight percent oxide based composition of $K_2O$ 1.0; $Na_2O$ 1.0; $Li_2O$ 0.5; ZnO 2.0; CaO 1.1; MgO 7.2; $Al_2O_3$ 8.7; $B_2O_3$ 27.0 and $SiO_2$ 51.5. The alumina bubbles, of the indicated size, used in the following examples have been previously described herein and were Rhinalox Bubble Alumina from Rhina-Schmelzwerk GMBH of West Germany.

The components of the grinding wheels in the examples below were combined in the following manner. Abrasive grit, liquid urea formaldehyde resin temporary binder and ethylene glycol, where used, were blended together. To this mixture was added a blend of the bond and dextrine powder and, where indicated, a 70/30 by weight combination of urea formaldehyde powdered resin and corn starch (T-1) and mixing continued to produce a uniform mixture. When alumina bubbles were used in the examples, they were then added to the combination with continued agitation to obtain a uniform blend. The resultant blend was placed in a mold and pressed to form a wheel of the preliminary size and shape (green wheel) and the wheel removed from the mold. Where indicated the green wheel was then dried. Firing of the green wheel was accomplished under the indicated conditions and the resulting cooled wheel finished to the desired size and shape.

EXAMPLE 1

| I-8 Internal grinding wheel without bubbles | |
|---|---|
| Sol-Gel Alumina Abrasive 1 (60 grit) | 100.0 grams |
| Bond A | 14.0 grams |
| 3029 UF Resin* | 2.4 grams |
| Dextrine | 2.0 grams |
| T-1 | 0.4 grams |
| Ethylene Glycol | 0.8 grams |

*65% by weight solid urea formaldehyde resin 35% by weight water

Firing Conditions: Room temperature to 2100° F. over 5.5 hours plus 2100° F. soak for 3 hours followed by natural cooling to room temperature (approximately 15.5 hours).
Finished wheel size: 0.756×0.630×0.250 inches, recessed 0.381×0.093 inches in one end.
Finished wheel weight: 8.25 grams

EXAMPLE 2

| I-8 Internal grinding wheel with alumina bubbles | |
|---|---|
| Sol-Gel Alumina Abrasive 1 (60 grit) | 100.0 grams |
| Bond A | 14.0 grams |
| 3029 UF Resin (See Example 1) | 3.4 grams |
| Dextrine | 3.0 grams |
| Ethylene Glycol | 0.5 grams |
| AB 36F Alumina bubbles** | 10.0 grams |

**Alumina bubbles having a size less than 36 mesh

Drying Conditions: Room temperature to 250° F. over 22 hours
Firing Conditions: Same as Example 1
Finished wheel size: Same as Example 1
Finished wheel weight: 8.98 grams

EXAMPLE 3

| M-4 Internal grinding wheel without bubbles | |
|---|---|
| Sol-Gel Alumina Abrasive 1 (60 grit) | 100.0 grams |
| Bond B | 14.2 grams |
| 3029 UF Resin (See Example 1) | 4.0 grams |
| Dextrine | 2.0 grams |
| T-1 | 0.4 grams |

Firing conditions and finished wheel size were the same as in Example 1, except that a firing temperature of 2150° F. was used.
Finished wheel weight: 9.28 grams

EXAMPLE 4

| M-4 Internal grinding wheel with alumina bubbles | |
|---|---|
| Sol-Gel Alumina Abrasive 1 (60 grit) | 100.0 grams |
| Bond B | 14.2 grams |
| 3029 UF Resin (See Example 1) | 4.0 grams |
| Dextrine | 2.0 grams |
| T-1 | 0.4 grams |
| Ethylene Glycol | 1.6 grams |
| AB 20/36 Alumina bubbles* | 5.0 grams |

*Alumina bubbles having a size smaller than 20 mesh but larger than 36 mesh

Firing conditions and finished wheel size were the same as in Example 1, except that a firing temperature of 2150° F. was used.
Finished wheel weight: 9.69 grams

EXAMPLE 5

| J-8 Internal grinding wheel without bubbles | |
|---|---|
| Sol-Gel Alumina Abrasive 2 (60 grit) | 100.0 grams |
| Bond B | 16.0 grams |
| 3029 UF Resin (See Example 1) | 2.7 grams |
| Dextrine | 2.0 grams |
| T-1 | 0.4 grams |
| Ethylene Glycol | 0.8 grams |

Firing conditions and wheel size were the same as in Example 1.
Finished wheel weight: 8.37 grams

EXAMPLE 6

| J-8 Internal grinding wheel with alumina bubbles | |
|---|---|
| Sol-Gel Alumina Abrasive 2 (60 grit) | 100.0 grams |
| Bond B | 16.0 grams |
| 3029 UF Resin (See Example 1) | 2.7 grams |
| Dextrine | 2.0 grams |
| T-1 | 0.4 grams |
| Ethylene Glycol | 1.6 grams |
| AB 36F Alumina Bubbles (Same Example 1) | 10.0 grams |

Firing conditions and wheel size were the same as in Example 1.
Finished wheel weight: 9.09 grams

EXAMPLE 7

| K-8 Internal grinding wheel without bubbles | |
|---|---|
| Sol-Gel Alumina Abrasive 1 (60 grit) | 60.0 grams |
| White Fused Alumina Abrasive (60 grit) | 40.0 grams |
| Bond B | 18.1 grams |
| 3029 UF Resin (See Example 1) | 3.2 grams |
| Dextrine | 2.0 grams |
| T-1 | 0.4 grams |

Firing conditions and wheel size were the same as in Example 1.
Finished wheel weight: 8.54 grams

EXAMPLE 8

| K-8 Internal grinding wheel with alumina bubbles | |
|---|---|
| Sol-Gel Alumina Abrasive 1 (60 grit) | 60.0 grams |
| White Fused Alumina Abrasive (60 grit) | 40.0 grams |
| Bond B | 18.1 grams |
| 3029 UF Resin (See Example 1) | 3.2 grams |
| Dextrine | 2.0 grams |
| T-1 | 0.4 grams |
| Ethylene Glycol | 1.6 grams |
| AB 36F Alumina Bubbles (See Example 1) | 15.0 grams |

Firing conditions and wheel size were the same as in Example 1.
Finished wheel weight: 9.60 grams Wheels according to Examples 1 to 8 were trued and used in the internal plunge grinding of ring shaped 52100 steel workpieces having a Rockwell C hardness of 60 to 62, a nominal external diameter of 3 inches, a nominal thickness of 0.375 inches and an internal diameter of from 1.2 to 1.275 inches. An aqueous based grinding fluid was employed along with rotation of the workpiece at 150 surface feet per minute (internal bore surface) and a wheel speed of 41009 RPM (revolutions per minute). The G ratio, i.e. the ratio of the volume of metal removed to the volume of wheel lost during grinding, was determined for each wheel and the following results obtained.

| Example No. | % Bubbles Relative to Grit | G-Ratio |
|---|---|---|
| 1 | 0 | 66.89 |
| 2 | 10 | 93.29 |
| 3 | 0 | 76.66 |
| 4 | 5 | 107.53 |
| 5 | 0 | 20.07 |
| 6 | 10 | 36.74 |
| 7 | 0 | 57.39 |
| 8 | 15 | 83.66 |

An increased G ratio translates to improved, more efficient and more cost effective grinding operations. The above results show an unexpected advance of the wheels containing bubbles over the same wheels without the bubbles.

A further unexpected advantage of this invention was observed in the physical properties of the wheels containing the bubbles, as shown in the following test results obtained on test bars ($1 \times 1\frac{3}{8} \times 5$ inches) prepared in accordance with the formulations and conditions of Examples 1 to 8 and tested in accordance with well known physical test procedures.

| Example No. | % Bubbles | E-Modulus ($\times 10^6$ psi) | MOR (psi) |
|---|---|---|---|
| 1 | 0 | 7.34 | 5315 |
| 2 | 10 | 8.94 | 6071 |
| 3 | 0 | 9.54 | 4619 |
| 4 | 5 | 10.41 | 4853 |
| 5 | 0 | 6.68 | 3134 |
| 6 | 10 | 7.57 | 3608 |
| 7 | 0 | 7.63 | 4457 |
| 8 | 15 | 11.27 | 7491 | psi = pounds per square inch
MOR = modulus of rupture

EXAMPLES 9 to 12

| Example No. | 9 | 10 | 11 | 12 |
|---|---|---|---|---|
| Sol-Gel Alumina | 100.0 | 100.0 | 100.0 | 100.0 |

-continued

| Example No. | 9 | 10 | 11 | 12 |
|---|---|---|---|---|
| Abrasive 1 (80 grit) | | | | |
| Bond A | 12.0 | 12.0 | 12.0 | 12.0 |
| 3029 UF Resin (See Example 1) | 2.4 | 2.4 | 2.4 | 2.4 |
| Dextrine | 3.0 | 3.0 | 3.0 | 3.0 |
| Ethylene Glycol | 1.1 | 1.1 | 1.1 | 1.1 |
| AB 20/36 Alumina Bubble* | 0 | 5.0 | 10.0 | 15.0 |
| Bar weight (grams) | 228.9 | 239.0 | 249.1 | 259.4 |
| E-Modulus ($\times 10^6$ psi) | 5.59 | 7.15 | 7.96 | 8.75 |
| MOR (psi) | 4475 | 4786 | 4863 | 5105 |

*See Example 4

All amounts of components shown in grams The $1 \times 1\frac{1}{8} \times 5$ inch test bars for Examples 9 to 12 were prepared in accordance with the firing conditions given in Example 1.

EXAMPLE 13

| | |
|---|---|
| Sol-Gel Alumina Abrasive 1 (80/100 grit) | 91.1 grams |
| Cubic Boron Nitride Abrasive (80/100 grit) | 8.9 grams |
| Bond C | 23.3 grams |
| 3029 UF Resin (See Example 1) | 11.2 grams |
| Dextrine | 2.3 grams |
| AB 36F Alumina Bubbles (See Example 2) | 5.0 grams Firing |

Conditions: Room temperature to 1525° F. over 14 hours plus 6 hours at 1525° F. followed by natural cooling to room temperature.
Wheel size: Same as in Example 1.
Finished wheel weight: 10.13 grams

What is claimed is

1. A vitreous bonded abrasive article comprising a) an abrasive phase having sintered sol-gel abrasive grits, b) a vitreous bond phase and c) inorganic, non-metallic bubbles having a softening temperature at least 50° F. greater than the firing temperature of the vitreous bond.

2. The vitreous bonded abrasive article according to claim 1 wherein the inorganic, non-metallic bubbles are present in an amount in the range of from 2 to 50% by weight based on the weight of the abrasive phase.

3. The vitreous bonded abrasive article according to claim 2 wherein the inorganic, non-metallic bubbles are present in an amount in the range of from 2 to 15% by weight based on the weight of the abrasive phase.

4. A vitreous bonded abrasive article according to claim 3 wherein the bubbles are essentially hollow alumina particles.

5. A vitreous bonded abrasive article according to claim 4 wherein the sintered, sol-gel abrasive grits are sintered, sol-gel, polycrystalline, alpha alumina abrasive grits.

6. The vitreous bonded abrasive article according to claim 4 wherein the sintered, sol-gel abrasive grits are sintered, sol-gel, submicron polycrystalline, high density, alpha alumina abrasive grits wherein said density is at least 95% of theoretical density.

7. A vitreous bonded abrasive article according to claim 2 wherein the abrasive phase has sintered sol-gel abrasive grits and non sol-gel second abrasive grits.

8. A vitreous bonded abrasive article according to claim 3 wherein the abrasive phase has sintered sol-gel abrasive grits and non sol-gel second abrasive grits.

9. A vitreous bonded abrasive article according to claim 7 wherein the non sol-gel second abrasive grits are selected from the group consisting of cofused alumina-zirconia, zirconia, silicon carbide, cubic boron nitride and fused alumina grits.

10. The vitreous bonded abrasive article according to claim 8 wherein the non sol-gel second abrasive grits are selected from the group consisting of cofused alumina-zirconia, zirconia, silicon carbide, cubic boron nitride and fused alumina.

11. A vitreous bonded abrasive article according to claim 9 wherein the abrasive phase comprises from 10 to 95% by weight of the abrasive phase of sintered sol-gel abrasive grits and from 5 to 90% by weight of the abrasive phase of the second abrasive grits.

12. A vitreous bonded abrasive article according to claim 10 wherein the abrasive phase comprises from 10 to 95% by weight of the abrasive phase of sintered sol-gel abrasive grits and from 5 to 90% by weight of the abrasive of the second abrasive grits.

13. The vitreous bonded abrasive article according to claim 12 wherein the particles are essentially hollow, essentially spherical alumina particles.

14. The vitreous bonded abrasive article according to claim 12 wherein the second abrasive grits are fused alumina grits.

15. The vitreous bonded abrasive article according to claim 12 wherein the second abrasive grits are cubic boron nitride grits.

16. The vitreous bonded abrasive article according to claim 13 wherein the second abrasive grits are fused alumina grits.

17. A vitreous bonded abrasive article according to claim 5 in the form of a grinding wheel.

18. A vitreous bonded abrasive article according to claim 16 in the form of a grinding wheel.

* * * * *